US012542362B2

(12) United States Patent
Lo et al.

(10) Patent No.: US 12,542,362 B2
(45) Date of Patent: Feb. 3, 2026

(54) ANTENNA SYSTEM

(71) Applicant: Quanta Computer Inc., Taoyuan (TW)

(72) Inventors: Yi-Chih Lo, Taoyuan (TW); Chung-Ting Hung, Taoyuan (TW); Chun-Yuan Wang, Taoyuan (TW); Jing-Yao Xu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 64 days.

(21) Appl. No.: 18/793,220

(22) Filed: Aug. 2, 2024

(65) Prior Publication Data

US 2025/0372874 A1 Dec. 4, 2025

(30) Foreign Application Priority Data

Jun. 4, 2024 (TW) ................................ 113205801

(51) Int. Cl.

*H01Q 9/04* (2006.01)
*H01Q 13/10* (2006.01)
*H01Q 15/14* (2006.01)

(52) U.S. Cl.

CPC ........... *H01Q 9/0414* (2013.01); *H01Q 13/10* (2013.01); *H01Q 15/14* (2013.01)

(58) Field of Classification Search

None

See application file for complete search history.

(56) References Cited

U.S. PATENT DOCUMENTS 12,362,499 B1 * 7/2025 Sikina .................. H01Q 9/0414
12,469,983 B2 * 11/2025 Elsallal ................ H01Q 21/061
12,469,986 B2 * 11/2025 Tezuka ...................... H01Q 1/50
2018/0027647 A1 * 1/2018 Rengarajan ............... G01S 7/03 342/175
2019/0252771 A1 * 8/2019 Yong ...................... H01Q 21/22
2021/0119345 A1 * 4/2021 Tan ...................... H01Q 21/064
2022/0344816 A1 * 10/2022 Coutts .................... H01Q 5/385
2023/0344118 A1 * 10/2023 Wang ....................... H01Q 1/48
2024/0266756 A1 * 8/2024 Choi ........................ H01Q 1/48
2025/0253533 A1 * 8/2025 Lin ........................ H01Q 1/525
2025/0309851 A1 * 10/2025 Kim ..................... H03H 7/1758
2025/0329910 A1 * 10/2025 Kolitsidas ................ H01Q 3/36

* cited by examiner

*Primary Examiner* — Wilson Lee

(74) *Attorney, Agent, or Firm* — McClure, Qualey & Rodack, LLP

(57) ABSTRACT

An antenna system includes a multilayer circuit board, a first radiation element, a second radiation element, a first ground plane, a first feeding element, a second feeding element, a second ground plane, and a plurality of conductive via elements. The multilayer circuit board includes a first layer and a second layer. The first radiation element has a first slot. The second radiation element has a second slot. The second radiation element is adjacent to the first radiation element. The first radiation element, the second radiation element, and the first ground plane are disposed on the first layer. The first feeding element extends across the first slot. The second feeding element extends across the second slot. The first feeding element, the second feeding element, and the second ground plane are disposed on the second layer. The conductive via elements couple the second ground plane to the first ground plane.

10 Claims, 6 Drawing Sheets

ANTENNA SYSTEM

CROSS REFERENCE TO RELATED APPLICATIONS

This application claims priority of Taiwan Patent Application No. 113205801 filed on Jun. 4, 2024, the entirety of which is incorporated by reference herein.

BACKGROUND OF THE INVENTION

Field of the Invention

The disclosure generally relates to an antenna system, and more particularly, to a wideband antenna system.

Description of the Related Art

With the advancements being made in mobile communication technology, mobile devices such as portable computers, mobile phones, multimedia players, and other hybrid functional portable electronic devices have become more common. To satisfy consumer demand, mobile devices have wireless communication functionality. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHZ, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If the operational bandwidth of an antenna used for signal reception and transmission is insufficient, it may degrade the communication quality of the mobile device in which it is installed. Accordingly, it has become a critical challenge for designers to design a small-size, wideband antenna system.

BRIEF SUMMARY OF THE INVENTION

In an exemplary embodiment, the invention is directed to an antenna system that includes a multilayer circuit board, a first radiation element, a second radiation element, a first ground plane, a first feeding element, a second feeding element, a second ground plane, and a plurality of conductive via elements. The multilayer circuit board includes a first layer and a second layer. The first radiation element has a first slot. The second radiation element has a second slot. The second radiation element is adjacent to the first radiation element. The first radiation element, the second radiation element, and the first ground plane are all disposed on the first layer of the multilayer circuit board. The first feeding element has a first feeding point. The first feeding element extends across the first slot. The second feeding element has a second feeding point. The second feeding element extends across the second slot. The first feeding element, the second feeding element, and the second ground plane are all disposed on the second layer of the multilayer circuit board. The conductive via elements are configured to couple the second ground plane to the first ground plane.

In some embodiments, each of the first radiation element and the second radiation element substantially has a square shape.

In some embodiments, each of the first slot and the second slot substantially has a straight-line shape.

In some embodiments, the first feeding element includes a first portion, a second portion, and a third portion. The first portion is coupled to the first feeding point. The third portion is coupled through the second portion to the first portion. The first portion is substantially perpendicular to the third portion.

In some embodiments, the second feeding element includes a fourth portion, a fifth portion, and a sixth portion. The fourth portion is coupled to the second feeding point. The sixth portion is coupled through the fifth portion to the fourth portion. The fourth portion is substantially perpendicular to the sixth portion.

In some embodiments, the multilayer circuit board further includes a third layer. The second layer is positioned between the first layer and the third layer.

In some embodiments, the antenna system further includes a reflective ground plane disposed on the third layer of the multilayer circuit board. The conductive via elements are further configured to couple the reflective ground plane to the second ground plane.

In some embodiments, the antenna system covers an operational frequency band from 2400 MHz to 2500 MHz.

In some embodiments, the length of each of the first radiation element and the second radiation element is from 0.25 to 0.5 wavelength of the operational frequency band.

In some embodiments, the length of each of the first feeding element and the second feeding element is substantially equal to 0.25 wavelength of the operational frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
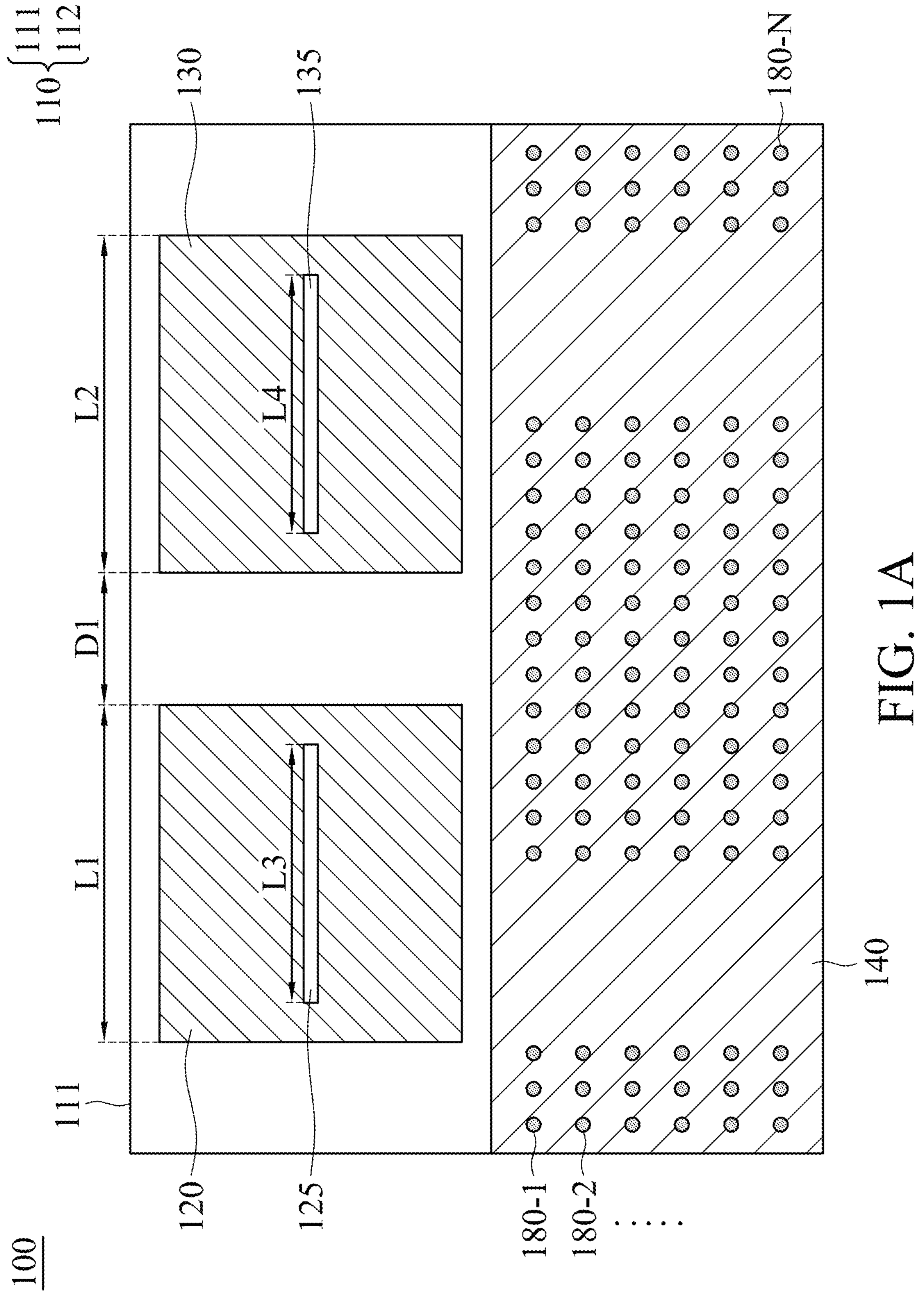
FIG. 1A is a top view of partial elements of an antenna system according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
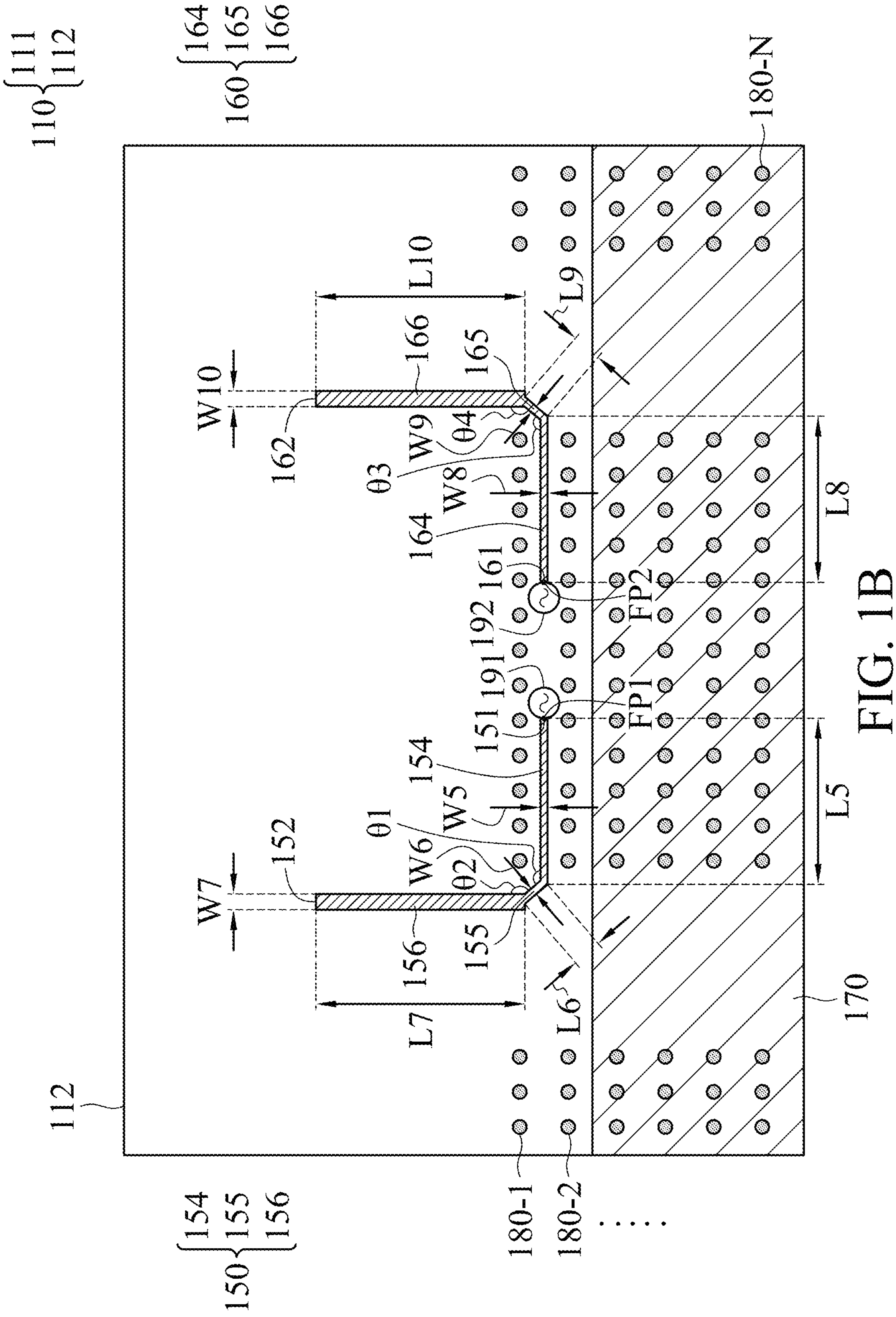
FIG. 1B is a top view of other elements of an antenna system according to an embodiment of the invention.

FIG. 1A is a top view of partial elements of an antenna system 100 according to an embodiment of the invention. FIG. 1B is a top view of the other elements of the antenna system 100 according to an embodiment of the invention. Please refer to FIG. 1A and FIG. 1B together. The antenna system 100 may be applied to a mobile device, such as a smart phone, a tablet computer, a notebook computer, a wireless access point, a router, or any device with a communication function. Alternatively, the antenna system 100 may be applied to an electronic device, such as any unit of IoT (Internet of Things).

In the embodiment of FIG. 1A and FIG. 1B, the antenna system 100 includes a multilayer circuit board 110, a first radiation element 120, a second radiation element 130, a first ground plane 140, a first feeding element 150, a second feeding element 160, a second ground plane 170, and a plurality of conductive via elements 180-1, 180-2, . . . , and 180-N, where "N" is any positive integer greater than or equal to 2. The first radiation element 120, the second radiation element 130, the first ground plane 140, the first feeding element 150, the second feeding element 160, and the second ground plane 170 may all be made of metal materials, such as copper, silver, aluminum, iron, or their alloys.

The multilayer circuit board 110 at least includes a first layer 111 and a second layer 112. The first layer 111 may be stacked up on the second layer 112. For example, each of the first layer 111 and the second layer 112 of the multilayer circuit board 110 may be implemented with an FR4 (Flame Retardant 4) substrate, but it is not limited thereto. In some embodiments, the first layer 111 and the second layer 112 of the multilayer circuit board 110 have the same sizes and the same shapes, such that the first layer 111 of the multilayer circuit board 110 can exactly cover the whole second layer 112.

The first radiation element 120 has a first slot 125, which may be a closed slot positioned at the center of the first radiation element 120. For example, the first radiation element 120 may substantially have a square shape, and its first slot 125 may substantially have a straight-line shape, but they are not limited thereto.

The second radiation element 130 has a second slot 135, which may be another closed slot positioned at the center of the second radiation element 130. For example, the second radiation element 130 may substantially have another square shape, and its second slot 135 may substantially have another straight-line shape, but they are not limited thereto. In some embodiments, the second slot 135 of the second radiation element 130 is substantially aligned with the first slot 125 of the first radiation element 120. In addition, the second radiation element 130 may be disposed adjacent to the first radiation element 120. It should be noted that the term "adjacent" or "close" over the disclosure means that the distance (spacing) between two corresponding elements is smaller than a predetermined distance (e.g., 15 mm or the shorter), but often does not mean that the two corresponding elements directly touch each other (i.e., the aforementioned distance/spacing between them is reduced to 0). In some embodiments, both the first radiation element 120 and the second radiation element 130 are floating.

For example, the first ground plane 140 may substantially have a relatively large rectangular shape, but it is not limited thereto. In some embodiments, the first radiation element 120, the second radiation element 130, and the first ground plane 140 are all disposed on the first layer 111 of the multilayer circuit board 110. Both the first radiation element 120 and the second radiation element 130 may be adjacent to the first ground plane 140.

The first feeding element 150 has a first feeding point FP1. The first feeding point FP1 may be coupled to a first signal source 191. For example, the first signal source 191 may be an RF (Radio Frequency) module for exciting the first radiation element 120. Specifically, the first feeding element 150 has a first end 151 and a second end 152 (i.e., an open end), and includes a first portion 154, a second portion 155 and a third portion 156. The first portion 154 (or the first end 151) is coupled to the first feeding point FP1. The third portion 156 is coupled through the second portion 155 to the first portion 154. Among the first feeding element 150, the first portion 154 may be substantially perpendicular to the third portion 156, a first obtuse angle $\theta 1$ may be formed between the second portion 155 and the first portion 154, and a second obtuse angle $\theta 2$ may be formed between the second portion 155 and the third portion 156. The third portion 156 (or the second end 152) of the first feeding element 150 can extend across the central point of the first slot 125 of the first radiation element 120. In some embodiments, the third portion 156 of the first feeding element 150 has a first vertical projection on the first radiation element 120, and the first vertical projection at least partially overlaps the first slot 125 of the first radiation element 120. That is, the first feeding element 150 does not directly touch the first radiation element 120 although the first feeding element 150 is disposed adjacent to the first radiation element 120.

The second feeding element 160 has a second feeding point FP2. The second feeding point FP2 may be coupled to a second signal source 192. For example, the second signal source 192 may be another RF module for exciting the second radiation element 130. Specifically, the second feeding element 160 has a first end 161 and a second end 162 (i.e., another open end), and includes a fourth portion 164, a fifth portion 165 and a sixth portion 166. The fourth portion 164 (or the first end 161) is coupled to the second feeding point FP2. The sixth portion 166 is coupled through the fifth portion 165 to the fourth portion 164. Among the second feeding element 160, the fourth portion 164 may be substantially perpendicular to the sixth portion 166, a third obtuse angle θ3 may be formed between the fifth portion 165 and the fourth portion 164, and a fourth obtuse angle θ4 may be formed between the fifth portion 165 and the sixth portion 166. The sixth portion 166 (or the second end 162) of the second feeding element 160 can extend across the central point of the second slot 135 of the second radiation element 130. In some embodiments, the sixth portion 166 of the second feeding element 160 has a second vertical projection on the second radiation element 130, and the second vertical projection at least partially overlaps the second slot 135 of the second radiation element 130. That is, the second feeding element 160 does not directly touch the second radiation element 130 although the second feeding element 160 is disposed adjacent to the second radiation element 130.

For example, the second ground plane 170 may substantially have a relatively small rectangular shape (compared with the first ground plane 140), which may be disposed opposite to the first ground plane 140, but it is not limited thereto. In some embodiments, the first feeding element 150, the second feeding element 160, and the second ground plane 170 are all disposed on the second layer 112 of the multilayer circuit board 110.

The conductive via elements 180-1, 180-2, . . . , and 180-N penetrate the first layer 111 and the second layer 112 of the multilayer circuit board 110. The conductive via elements 180-1, 180-2, . . . , and 180-N are configured to couple the second ground plane 170 to the first ground plane 140. It should be understood that since the second ground plane 170 has relatively small area, some of the conductive via elements 180-1, 180-2, . . . and 180-N are positioned outside the second ground plane 170. In some embodiments, the first portion 154 of the first feeding element 150 and the fourth portion 164 of the second feeding element 160 can extend through a plurality of gaps between the adjacent ones of the conductive via elements 180-1, 180-2, . . . , and 180-N.

Figure 2:
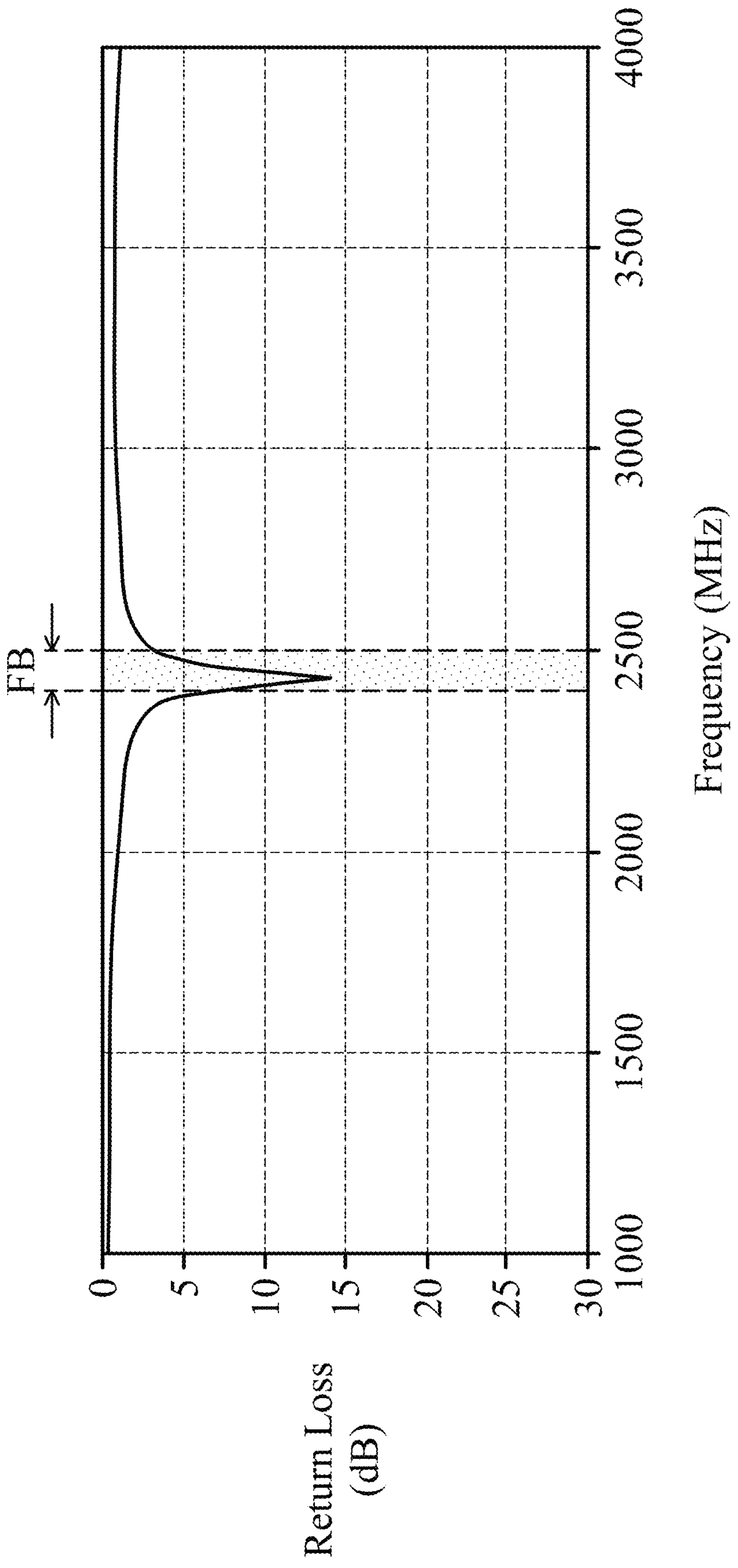
FIG. 2 is a diagram of return loss of an antenna system according to an embodiment of the invention.

FIG. 2 is a diagram of return loss of the antenna system 100 according to an embodiment of the invention. The horizontal axis represents the operational frequency (MHz), and the vertical axis represents the return loss (dB). According to the measurement of FIG. 2, the antenna system 100 can cover an operational frequency band FB. For example, the operational frequency band FB may be from 2400 MHz to 2500 MHz. Therefore, the antenna system 100 can support at least the wideband operations of BLE (Bluetooth Low Energy) and WLAN (Wireless Local Area Network) 2.4 GHz.

In some embodiments, the operational principles of the antenna system 100 will be described as follows. The first radiation element 120 and its first slot 125 can be excited by the first feeding element 150 using a coupling mechanism, so as to generate the operational frequency band FB. Similarly, the second radiation element 130 and its second slot 135 can be excited by the second feeding element 160 using another coupling mechanism, so as to contribute to the operational frequency band FB. In order to improve the impedance matching of the antenna system 100, each of the first feeding element 150 and the second feeding element 160 has a respective variable-width structure. According to practical measurements, the incorporation of the conductive via elements 180-1, 180-2, . . . , and 180-N can help to suppress the leakage of electromagnetic waves from the first feeding element 150 and the second feeding element 160, thereby increasing the radiation efficiency of the antenna system 100.

In some embodiments, the element sizes of the antenna system 100 will be described as follows. The length L1 of the first radiation element 120 may be from 0.25 to 0.5 wavelength (λ/4~λ/2) of the operational frequency band FB of the antenna system 100, such as about 0.3 wavelength (3λ/10). The length L2 of the second radiation element 130 may be from 0.25 to 0.5 wavelength (λ/4~ λ/2) of the operational frequency band FB of the antenna system 100, such as about 0.3 wavelength (3λ/10). The length L3 of the first slot 125 may be from 0.125 to 0.25 wavelength (λ/8~λ/4) of the operational frequency band FB of the antenna system 100, such as about 0.2 wavelength (λ/5). The length L4 of the second slot 135 may be from 0.125 to 0.25 wavelength (λ/8~λ/4) of the operational frequency band FB of the antenna system 100, such as about 0.2 wavelength (λ/5). The distance D1 between the first radiation element 120 and the second radiation element 130 may be from 8 mm to 12 mm, such as about 9.9 mm. Among the first feeding element 150, the length L7 of the third portion 156 may be substantially equal to the length L5 of the first portion 154, the length L6 of the second portion 155 may be from 1 mm to 2 mm, the width W5 of the first portion 154 may be from 0.1 mm to 0.3 mm, the width W6 of the second portion 155 may be from 0.1 mm to 0.3 mm, and the width W7 of the third portion 156 may be from 0.5 mm to 0.7 mm. The length of the first feeding element 150 (i.e., L5+L6+L7) may be substantially equal to 0.25 wavelength (λ/4) of the operational frequency band FB of the antenna system 100. Among the second feeding element 160, the length L10 of the sixth portion 166 may be substantially equal to the length L8 of the fourth portion 164, the length L9 of the fifth portion 165 may be from 1 mm to 2 mm, the width W8 of the fourth portion 164 may be from 0.1 mm to 0.3 mm, the width W9 of the fifth portion 165 may be from 0.1 mm to 0.3 mm, and the width W10 of the sixth portion 166 may be from 0.5 mm to 0.7 mm. The length of the second feeding element 160 (i.e., L8+L9+L10) may be substantially equal to 0.25 wavelength (λ4) of the operational frequency band FB of the antenna system 100. The first obtuse angle θ1 may be from 120 to 150 degrees, such as about 135 degrees. The second obtuse angle θ2 may be from 120 to 150 degrees, such as about 135 degrees. The third obtuse angle θ3 may be from 120 to 150 degrees, such as about 135 degrees. The fourth obtuse angle θ4 may be from 120 to 150 degrees, such as about 135 degrees. The above ranges of element sizes are calculated and obtained according to many experimental results, and they help to optimize the operational bandwidth, the impedance matching, and the radiation efficiency of the antenna system 100.

Figure 3:
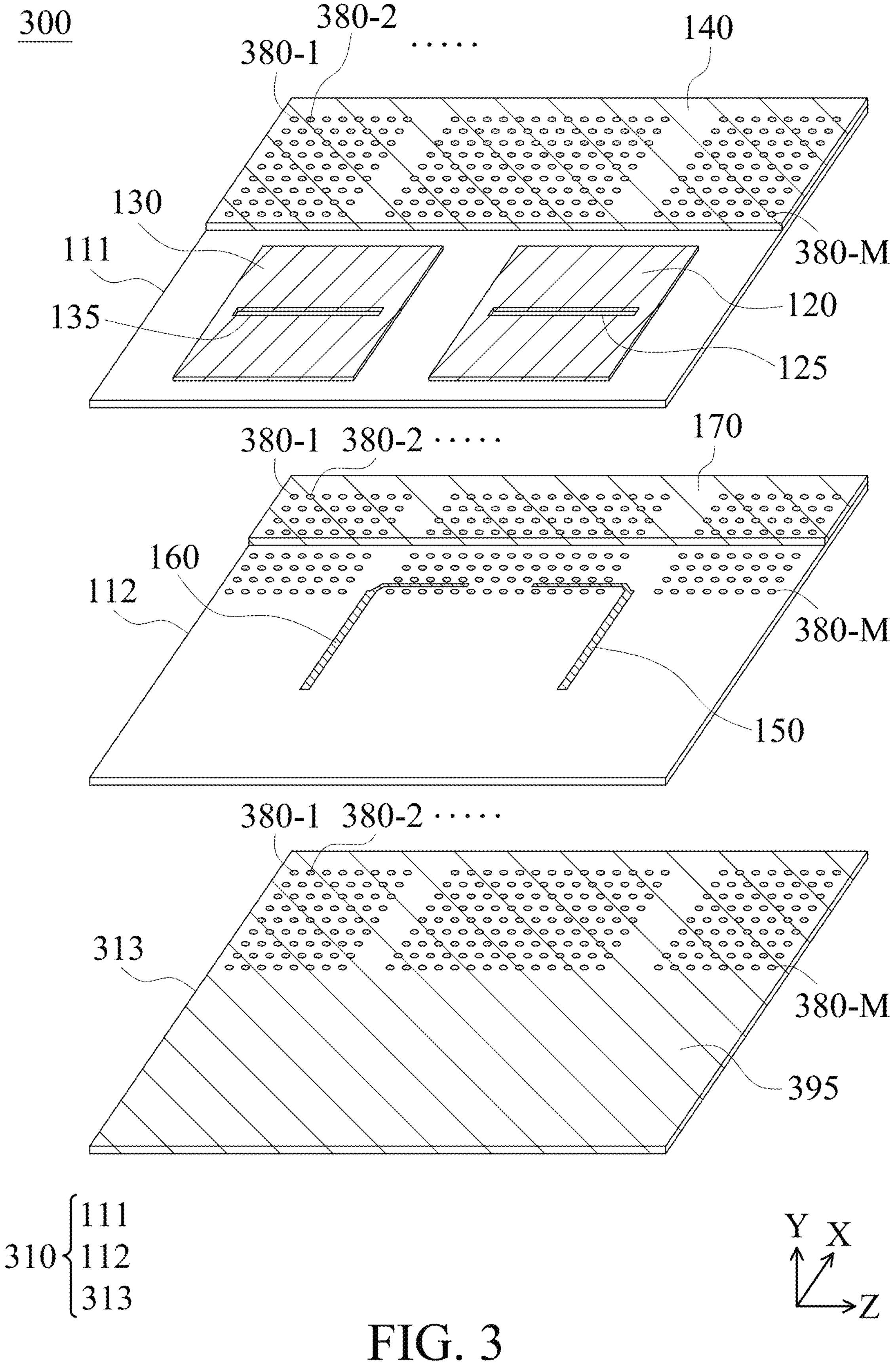
FIG. 3 is an exploded view of an antenna system according to an embodiment of the invention.

FIG. 3 is an exploded view of an antenna system 300 according to an embodiment of the invention. FIG. 3 is similar to FIG. 1A and FIG. 1B. In the embodiment of FIG. 3, besides the first layer 111 and the second layer 112 as mentioned above, a multilayer circuit board 310 of the antenna system 300 further includes a third layer 313. The second layer 112 is positioned between the first layer 111 and the third layer 313. In addition, the antenna system 300 further includes a reflective ground plane 395, which may be made of a metal material and disposed on the third layer 313 of the multilayer circuit board 310. Also, a plurality of conductive via elements 380-1, 380-2, . . . , and 380-M of the antenna system 300 penetrate the first layer 111, the second layer 112 and the third layer 313 of the multilayer circuit board 310. The conductive via elements 380-1, 380-2, . . . , and 380-M are configured to couple the reflective ground plane 395 to the first ground plane 140 and the second ground plane 170, where "M" is any positive integer greater than or equal to 3. Other features of the antenna system 300 of FIG. 3 are similar to those of the antenna system 100 of FIG. 1A and FIG. 1B. Accordingly, the two embodiments can achieve similar levels of performance.

Figure 4:
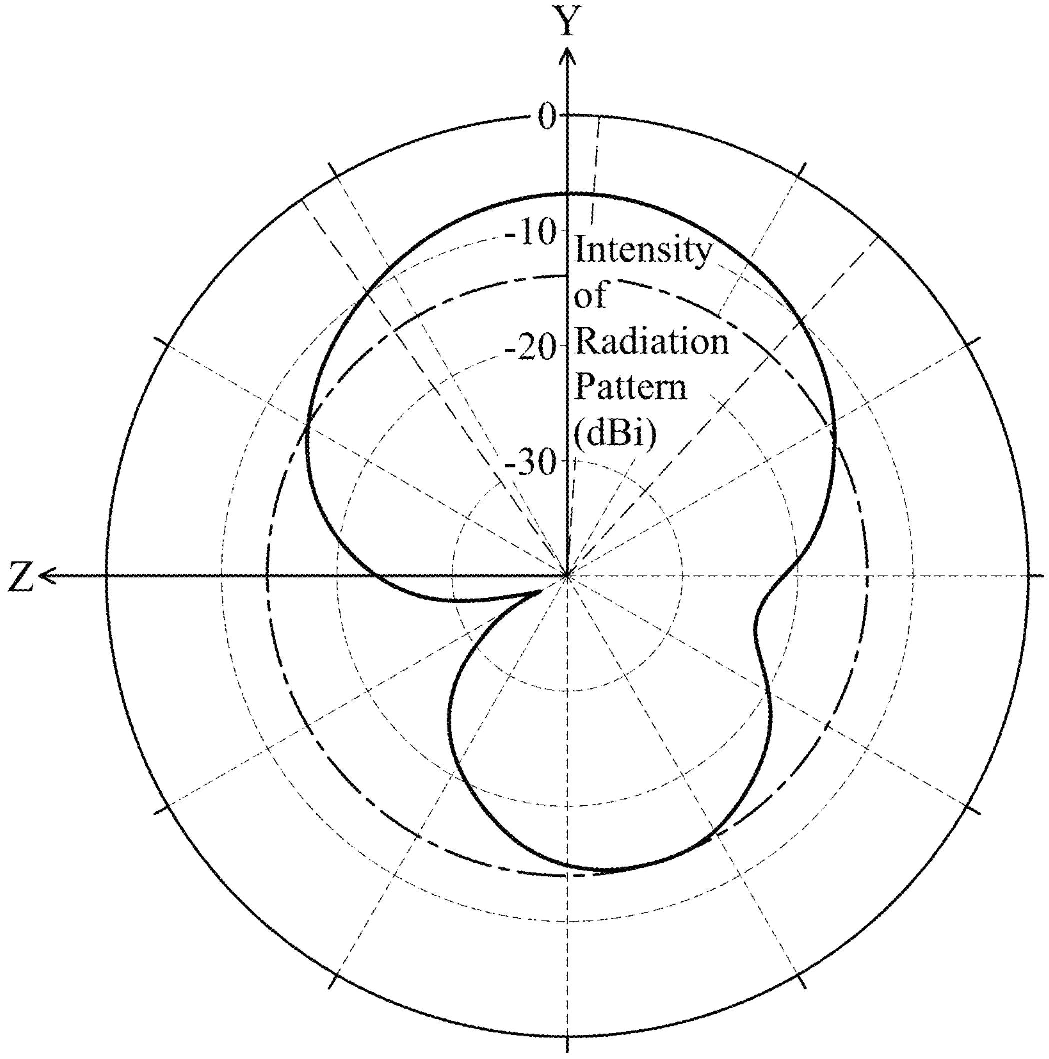
FIG. 4 is a radiation pattern of a first radiation element of an antenna system according to an embodiment of the invention.

FIG. 4 is a radiation pattern of the first radiation element 120 of the antenna system 300 according to an embodiment of the invention (which may be measured along the YZ-plane). According to the measurement of FIG. 4, the incorporation of the reflective ground plane 395 can help to increase the radiation gain of the first radiation element 120 in the direction of +Y-axis.

Figure 5:
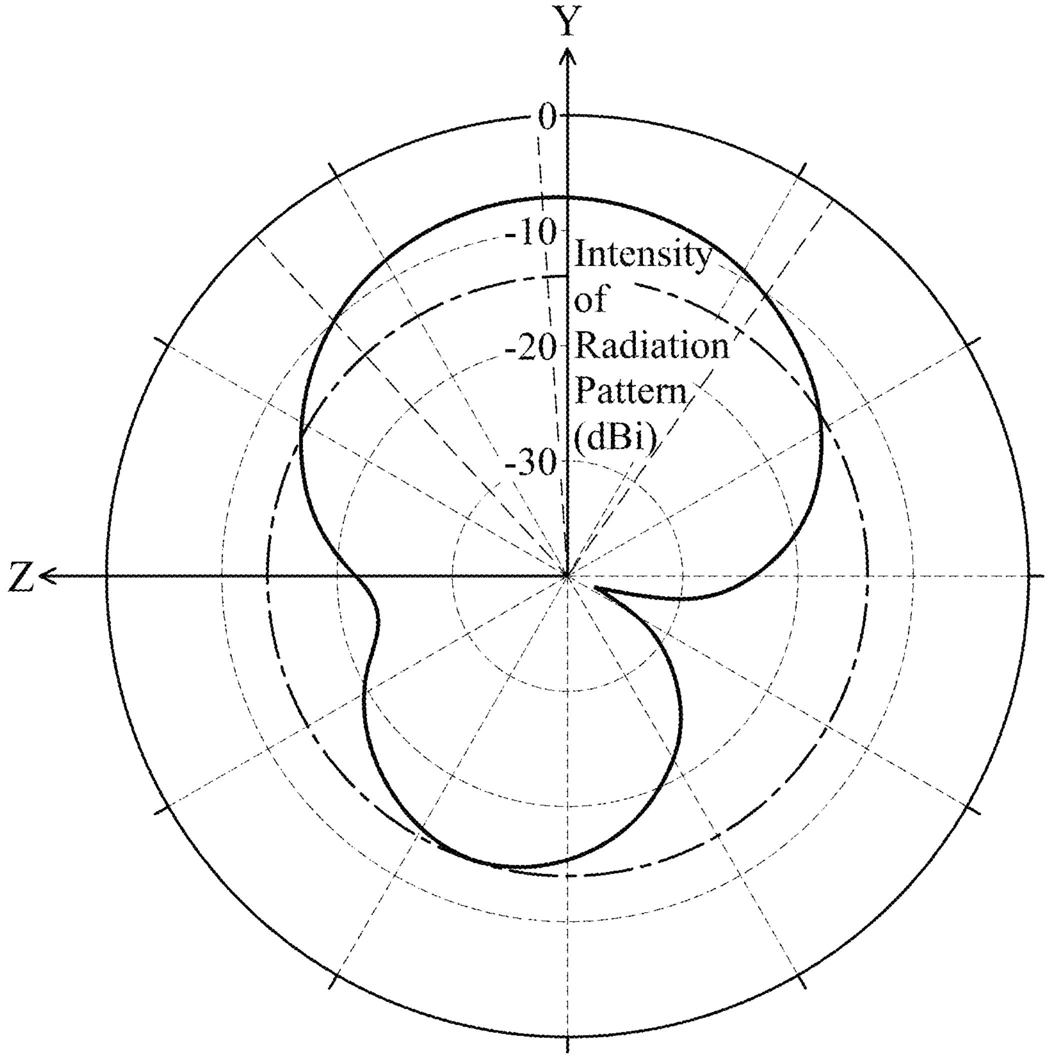
FIG. 5 is a radiation pattern of a second radiation element of an antenna system according to an embodiment of the invention.

FIG. 5 is a radiation pattern of the second radiation element 130 of the antenna system 300 according to an embodiment of the invention (which may be measured along the YZ-plane). According to the measurement of FIG. 5, the incorporation of the reflective ground plane 395 can also help to increase the radiation gain of the second radiation element 130 in the direction of +Y-axis.

The invention proposes a novel antenna system. In comparison to the conventional design, the invention has at least the advantages of small size, wide bandwidth, and high radiation efficiency. Therefore, the invention is suitable for application in a variety of mobile communication devices or the IoT.

Note that the above element sizes, element shapes, and frequency ranges are not limitations of the invention. An antenna designer can fine-tune these settings or values to meet different requirements. It should be understood that the antenna system of the invention is not limited to the configurations of FIGS. 1 to 5. The invention may merely include any one or more features of any one or more embodiments of FIGS. 1 to 5. In other words, not all of the features displayed in the figures should be implemented in the antenna system of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system, comprising:

a multilayer circuit board, comprising a first layer and a second layer;

a first radiation element, having a first slot;

a second radiation element, having a second slot, wherein the second radiation element is adjacent to the first radiation element;

a first ground plane, wherein the first radiation element, the second radiation element, and the first ground plane are disposed on the first layer of the multilayer circuit board;

a first feeding element, having a first feeding point, wherein the first feeding element extends across the first slot;

a second feeding element, having a second feeding point, wherein the second feeding element extends across the second slot;

a second ground plane, wherein the first feeding element, the second feeding element, and the second ground plane are disposed on the second layer of the multilayer circuit board; and a plurality of conductive via elements, configured to couple the second ground plane to the first ground plane.

2. The antenna system as claimed in claim 1, wherein each of the first radiation element and the second radiation element substantially has a square shape.

3. The antenna system as claimed in claim 1, wherein each of the first slot and the second slot substantially has a straight-line shape.

4. The antenna system as claimed in claim 1, wherein the first feeding element comprises a first portion, a second portion and a third portion, the first portion is coupled to the first feeding point, the third portion is coupled through the second portion to the first portion, and the first portion is substantially perpendicular to the third portion.

5. The antenna system as claimed in claim 4, wherein the second feeding element comprises a fourth portion, a fifth portion and a sixth portion, the fourth portion is coupled to the second feeding point, the sixth portion is coupled through the fifth portion to the fourth portion, and the fourth portion is substantially perpendicular to the sixth portion.

6. The antenna system as claimed in claim 1, wherein the multilayer circuit board further comprises a third layer, and the second layer is positioned between the first layer and the third layer.

7. The antenna system as claimed in claim 6, further comprising:

a reflective ground plane, disposed on the third layer of the multilayer circuit board, wherein the conductive via elements are further configured to couple the reflective ground plane to the second ground plane.

8. The antenna system as claimed in claim 1, wherein the antenna system covers an operational frequency band from 2400 MHz to 2500 MHz.

9. The antenna system as claimed in claim 8, wherein a length of each of the first radiation element and the second radiation element is from 0.25 to 0.5 wavelength of the operational frequency band.

10. The antenna system as claimed in claim 8, wherein a length of each of the first feeding element and the second feeding element is substantially equal to 0.25 wavelength of the operational frequency band.

* * * * *